(12) United States Patent
Nakazono et al.

(10) Patent No.: US 10,180,090 B2
(45) Date of Patent: Jan. 15, 2019

(54) INTERNAL COMBUSTION ENGINE AND COGENERATION SYSTEM

(71) Applicant: YANMAR CO., LTD., Osaka-shi, Osaka (JP)

(72) Inventors: Toru Nakazono, Osaka (JP); Khandoker Abu Raihan, Osaka (JP); Hiroyuki Okada, Osaka (JP)

(73) Assignee: Yanmar Co., Ltd., Osaka-shi (JP)

( * ) Notice: Subject to any disclaimer, the term of this patent is extended or adjusted under 35 U.S.C. 154(b) by 128 days.

(21) Appl. No.: 14/777,597

(22) PCT Filed: Dec. 12, 2013

(86) PCT No.: PCT/JP2013/083381
§ 371 (c)(1),
(2) Date: Sep. 16, 2015

(87) PCT Pub. No.: WO2014/147905
PCT Pub. Date: Sep. 25, 2014

(65) Prior Publication Data
US 2016/0290189 A1 Oct. 6, 2016

(30) Foreign Application Priority Data

Mar. 19, 2013 (JP) ................................. 2013-056925

(51) Int. Cl.
*F01M 5/00* (2006.01)
*F01M 1/08* (2006.01)
(Continued)

(52) U.S. Cl.
CPC ............. *F01M 5/005* (2013.01); *F01M 1/08* (2013.01); *F01M 5/002* (2013.01); *F01P 7/167* (2013.01);
(Continued)

(58) Field of Classification Search
CPC ... F01M 5/002; F01M 5/005; F01M 2005/004
(Continued)

(56) References Cited

U.S. PATENT DOCUMENTS

| | | | |
|---|---|---|---|
| 6,668,764 B1 | 12/2003 | Henderson et al. | |
| 2008/0251235 A1* | 10/2008 | Zhou ................. | B60H 1/00278 |
| | | | 165/41 |

(Continued)

FOREIGN PATENT DOCUMENTS

| | | |
|---|---|---|
| JP | H6-257430 A | 9/1994 |
| JP | 2000-64884 A | 2/2000 |

(Continued)

*Primary Examiner* — Jacob Amick
*Assistant Examiner* — Charles Brauch
(74) *Attorney, Agent, or Firm* — Norton Rose Fulbright US LLP

(57) ABSTRACT

An internal combustion engine, which can improve an annual energy consumption efficiency, is provided. A gas engine 1 includes: an oil cooler 11 having a passage via which heat is exchanged between engine cooling water and lubricating oil; and a control unit 12 configured to control a temperature of the engine cooling water to a constant temperature so as to cool the lubricating oil during high load operation and to heat the lubricating oil during low to medium load operation. The control unit 12 increases the temperature of the engine cooling water during low to medium load operation compared with the temperature of the engine cooling water during high load operation. An oil jet 18*a*, which is configured to inject the lubricating oil into a rear surface of a piston 17, is provided.

12 Claims, 8 Drawing Sheets

(51) Int. Cl.
*F01P 7/16* (2006.01)
*F01P 11/08* (2006.01)

(52) U.S. Cl.
CPC ........ *F01P 11/08* (2013.01); *F01M 2005/004* (2013.01); *F01P 2060/04* (2013.01)

(58) Field of Classification Search
USPC ..................................................... 123/41.33
See application file for complete search history.

(56) References Cited

U.S. PATENT DOCUMENTS

2009/0044768 A1\* 2/2009 Arvan ...................... F01P 3/08
　　　　　　　　　　　　　　　　　　　　　　123/41.35
2009/0107424 A1\* 4/2009 Blassnitz ................ F01P 7/048
　　　　　　　　　　　　　　　　　　　　　　123/41.12

FOREIGN PATENT DOCUMENTS

| JP | 2004108153 A | \* | 4/2004 | |
|----|----|----|----|----|
| JP | 2004-218502 A | | 8/2004 | |
| JP | 2007016651 A | \* | 1/2007 | ......... F16H 57/0413 |
| JP | 2010-84751 A | | 4/2010 | |
| JP | 2012-215138 A | | 11/2012 | |

\* cited by examiner

FIG.3
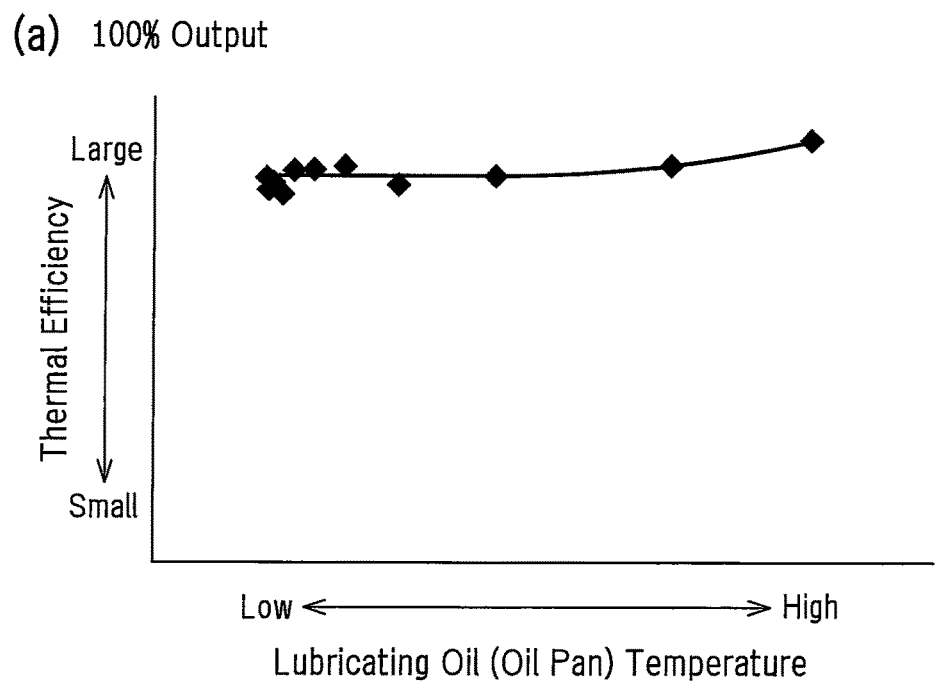
(a) 100% Output
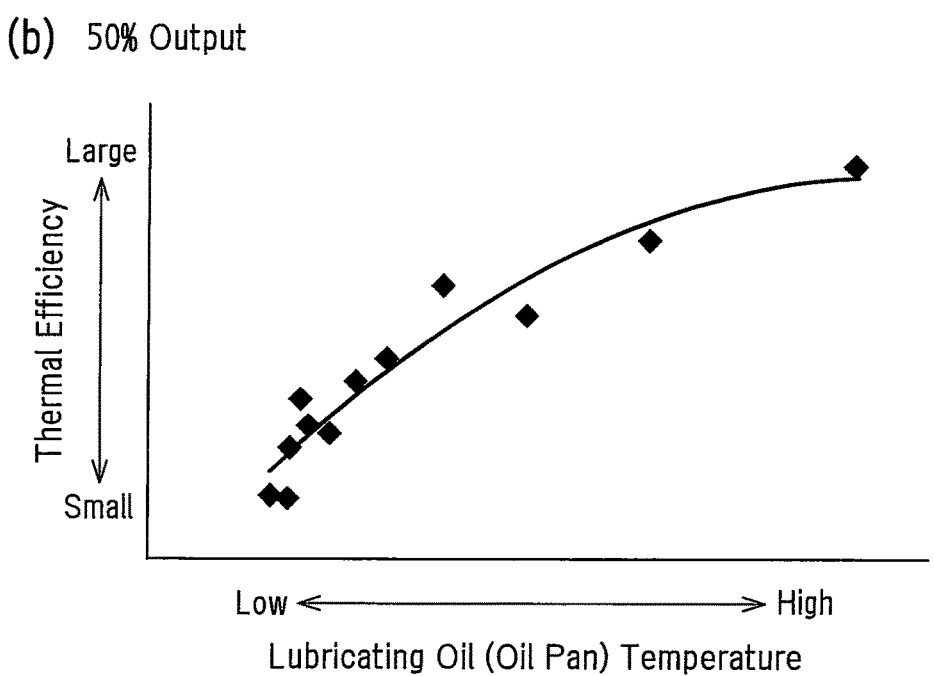
(b) 50% Output

FIG.5
(a)
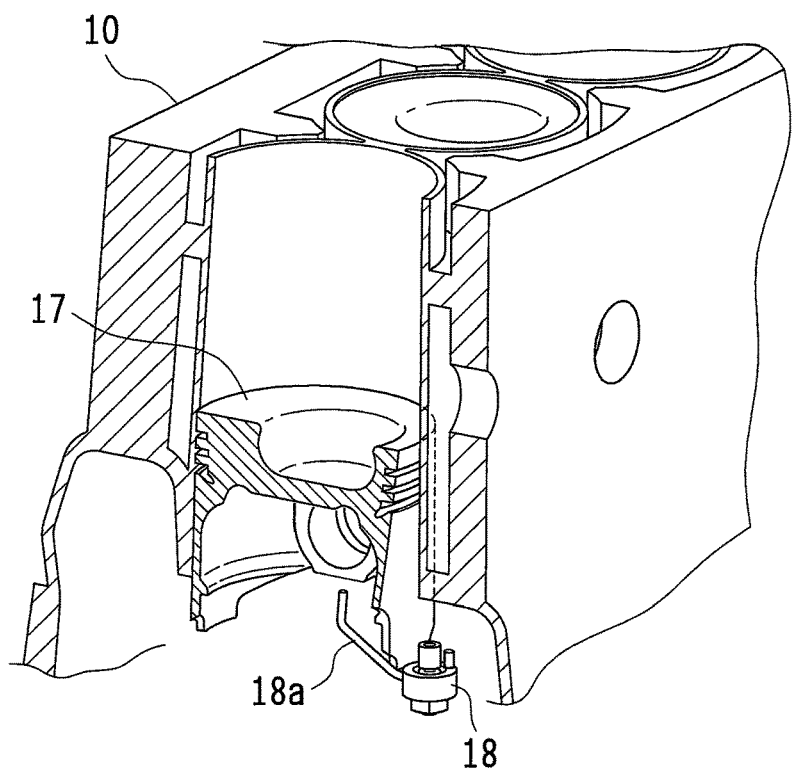
(b)
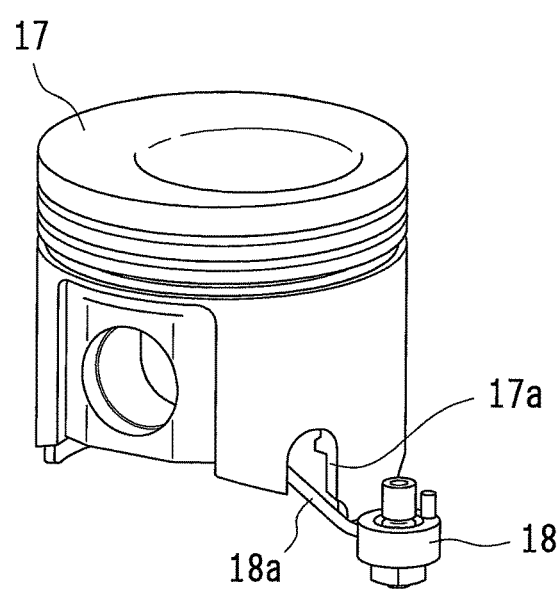

INTERNAL COMBUSTION ENGINE AND COGENERATION SYSTEM

TECHNICAL FIELD

The present invention relates to internal combustion engines having an oil cooler.

BACKGROUND ART

Conventionally, lubricating oil temperature control devices are known, which are configured to heat or cool lubricating oil in an internal combustion engine.

Such lubricating oil temperature control devices are configured to decrease quickly the temperature of the lubricating oil to an appropriate temperature so as to obtain a cooling effect of the internal combustion engine, and further configured to increase quickly the temperature of the lubricating oil to an appropriate temperature so as to reduce a period of time for warming up the internal combustion engine (for example, see Patent Document 1).

PRIOR ART DOCUMENTS

Patent Document

[Patent Document 1] JP 2004-218502 A

SUMMARY OF INVENTION

Problem to be Solved by Invention

However, the above-described conventional lubricating oil temperature control device of an internal combustion engine is to simply heat the lubricating oil at the time of the warm-up operation, thus an annual energy consumption efficiency is not considered.

That is, when such an internal combustion engine is used, for example, as a drive source of an air conditioner, a high rotational speed and high load operation mode is required for certain, very short periods of time in summer and in winter. For the rest of the year, the internal combustion engine is mostly driven in the low rotational speed and medium load operation mode or the low rotational speed and low load operation mode. Therefore, in the internal combustion engine, even if the energy consumption efficiency is somewhat degraded in the high rotational speed and high load operation mode, the annual energy consumption efficiency may be improved if the energy consumption efficiency is improved in the low rotational speed and medium load operation mode and in the low rotational speed and low load operation mode. There is no conventional lubricating oil temperature control device configured to improve the energy consumption efficiency in the low rotational speed and medium load operation mode or in the low rotational speed and low load operation mode.

The present invention was made in consideration of the above circumstances, and an object of the present invention is to provide an internal combustion engine capable of improving the annual energy consumption efficiency.

Means for Solving Problem

In order to solve the above-described problem, an internal combustion engine according to the present invention includes: an oil cooler having a passage via which heat is exchanged between engine cooling water and lubricating oil; and a control unit configured to control a temperature of the engine cooling water to a constant temperature so as to cool the lubricating oil during high load operation and to heat the lubricating oil during low to medium load operation.

The above-described internal combustion engine may further include a circulation passage of the engine cooling water, the circulation passage including: a heat exchanger disposed in the passage via which the heat is exchanged between the engine cooling water and the lubricating oil, the heat exchanger being configured to cool the engine cooling water; a cooling water pump configured to allow the engine cooling water to pass through the heat exchanger; and a bypass passage configured to not pass through but skip and bypass the heat exchanger and the cooling water pump. The control unit may adjust an operational force of the cooling water pump so as to control the temperature of the engine cooling water to the constant temperature by adjusting an amount of the engine cooling water passing through the heat exchanger and being cooled, and an amount of the engine cooling water passing through the bypass passage and not being cooled.

In the above-described internal combustion engine, the circulation passage may be configured so that the engine cooling water passes through an internal combustion engine main body and/or an exhaust passage.

In the above-described internal combustion engine, the control unit may increase the temperature of the engine cooling water during low to medium load operation compared with the temperature of the engine cooling water during high load operation.

The above-described internal combustion engine may further include an oil jet configured to inject the lubricating oil into a rear surface of a piston.

The above-described internal combustion engine may be a gas engine for a cogeneration system, which operates at low to medium load during a normal operation, and operates at high load during a heat main operation.

In order to solve the above-described problem, the cogeneration system according to the present invention uses the above-described internal combustion engine as a drive source.

Effects of Invention

With the present invention, it is possible to improve the annual energy consumption efficiency.

BRIEF DESCRIPTION OF DRAWINGS

FIG. 3(a) is a graph showing a relationship between the thermal efficiency and the temperature of the lubricating oil during 100% output, and FIG. 3(b) is a graph showing a relationship between the thermal efficiency and the temperature of the lubricating oil during 50% output.

FIG. 5(a) is a partially exploded perspective view of a piston of the internal combustion engine according to another embodiment of the present invention. FIG. 5(b) is a perspective view showing the piston and an oil jet in FIG. 5(a).

MODES FOR CARRYING OUT INVENTION

Hereinafter, an embodiment of the present invention will be described with reference to the drawings.

Figure 1:
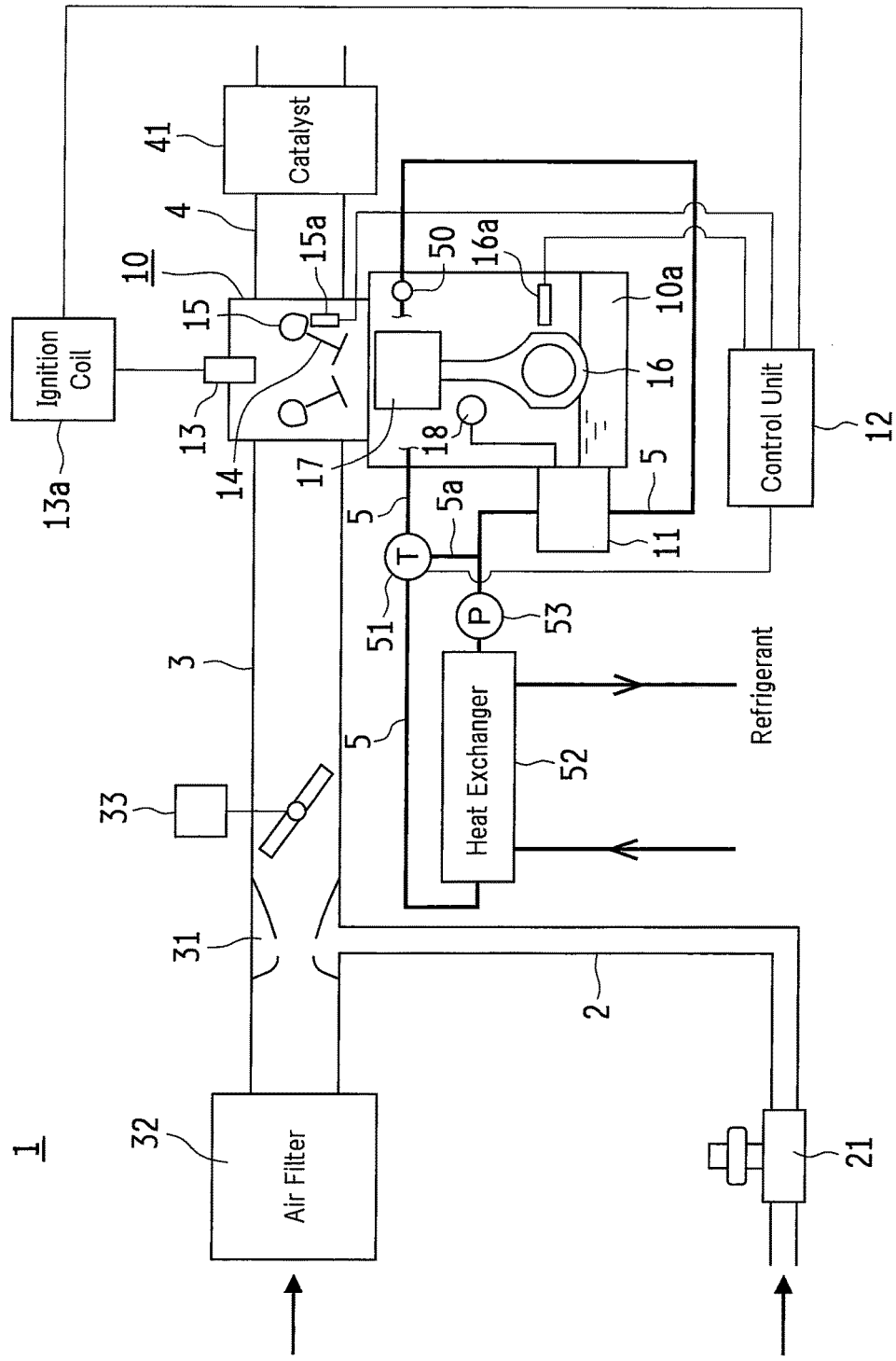
FIG. 1 is a schematic view showing an entire schematic configuration of an internal combustion engine according to the present invention.
Figure 2:
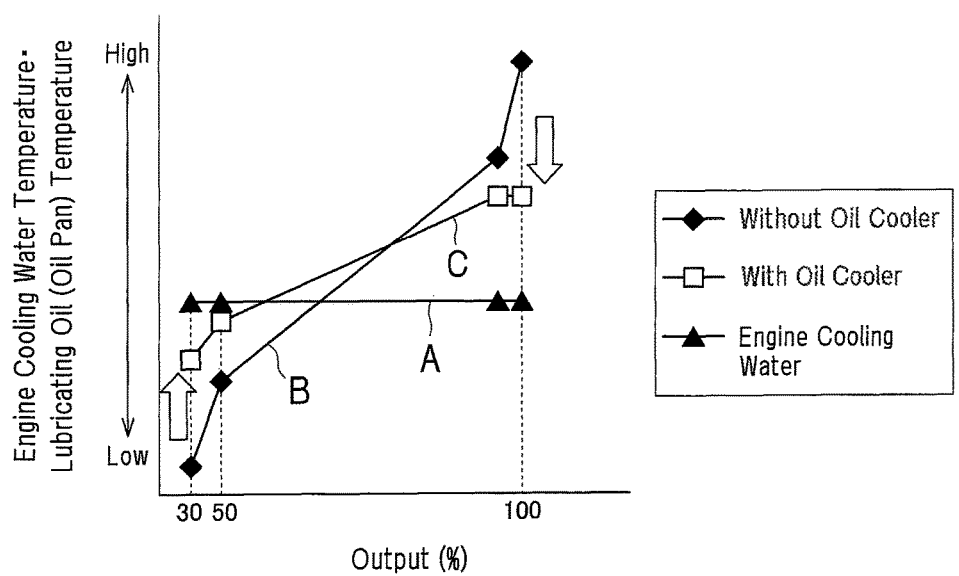
FIG. 2 is a graph showing a relationship between an output load, and a temperature of engine cooling water and a temperature of lubricating oil in the internal combustion engine according to the present invention.

FIG. 1 shows an entire schematic configuration of a gas engine 1 according to the present invention. FIG. 2 shows a relationship between an output load, and a temperature of engine cooling water and a temperature of lubricating oil in the gas engine 1.

The gas engine 1 includes an oil cooler 11 and a control unit 12 that controls the temperature of the engine cooling water to a constant temperature so that the lubricating oil is cooled during high load operation and heated during low to medium load operation.

Hereinafter, the configuration of the gas engine 1 will be generally described.

A fuel gas from a regulator 21 passes through a fuel gas supply passage 2 to be supplied to a mixer 31. In the mixer 31, an air supplied through an air filter 32 is mixed with the fuel gas so that an appropriate amount of air fuel mixture corresponding to an opening degree of a throttle valve 33 is supplied from an intake passage 3 to a gas engine main body 10.

In the gas engine main body 10, ignition of the air fuel mixture by a spark plug 13 is controlled by the control unit 12 via an ignition coil 13a. In this case, an ignition timing is determined by detecting, by a cam sensor 15a, movement of a cam 15 that operates an intake/exhaust valve 14. Also, a rotational speed is determined, by a crank sensor 16a, by detecting movement of a crank 16 linked with a piston 17.

An exhaust gas from the gas engine main body 10 passes from an exhaust passage 4 through a catalyst 41 to be purified, then discharged via a silencer (not shown).

The gas engine main body 10 includes a circulation passage 5 of the engine cooling water. On the downstream side of the circulation passage 5 that is extended out of the gas engine main body 10, a thermostat 51 is provided. On the downstream side of the thermostat 51, the circulation passage 5 has a heat exchanger 52 to cool the engine cooling water by a refrigerant. The circulation passage 5 is divided, on the downstream side of the thermostat 51, into the circulation passage 5 having a cooling water pump 53 on the further downstream side, and a shortcut passage 5a to skip the heat exchanger 52 and the cooling water pump 53 for joining to the circulation passage 5. The circulation passage 5 after joining passes through the oil cooler 11 and re-enters the gas engine main body 10.

The engine cooling water is circulated in the circulation passage 5 by a pressure pump 50 that is provided in the gas engine main body 10 and that is driven linked with the rotation of the gas engine. When the temperature of the engine cooling water detected by the thermostat 51 is low, the engine cooling water passes through the shortcut passage 5a and flows again into the gas engine main body 10 via the oil cooler 11. When the temperature of the engine cooling water detected by the thermostat 51 is high, the cooling water pump 53 is operated so that the engine cooling water passes through the heat exchanger 52 and is cooled, then the engine cooling water flows again into the gas engine main body 10 via the oil cooler 11. In this case, by adjusting the operational force of the cooling water pump 53, it is possible to adjust the amount of the engine cooling water passing through the circulation passage 5 and that passing through the shortcut passage 5a.

By the oil cooler 11, heat is exchanged between the lubricating oil accumulated in an oil pan 10a at the bottom of the gas engine main body 10 and the engine cooling water, thus the lubricating oil is cooled or heated by the engine cooling water. The inside of the gas engine main body 10 is lubricated, with the lubricating oil cooled or heated by the oil cooler 11, using an oil pump 18 operated linked with the rotation of the gas engine 1.

The control unit 12 detects the rotational speed of the gas engine 1 from the crank sensor 16a so as to determine the output state of the gas engine 1. Also, the control unit 12 controls the operational temperature of the thermostat 51 so that the engine cooling water having a predetermined temperature is constantly circulated.

As shown in FIG. 2, compared with the temperature B of the lubricating oil in the oil pan 10a when the oil cooler 11 is not used, the temperature A of the engine cooling water is set to be low during 100% output of the gas engine 1, and is set to be high during 50% output of the gas engine 1.

Accordingly, the temperature C of the lubricating oil accumulated in the oil pan 10a when the oil cooler 11 is used is decreased by the engine cooling water passing through the oil cooler 11 when the lubricating oil has a high temperature during 100% output. On the other hand, the temperature C is increased by the engine cooling water passing through the oil cooler 11 when the lubricating oil has a lower temperature than the temperature of the engine cooling water during 50% or 30% output. As shown in FIG. 3(a), during 100% output, variation in the thermal efficiency of the gas engine 1 is small relative to variation in the temperature of the lubricating oil accumulated in the oil pan 10a. However, as shown in FIG. 3(b), during 50% output, the variation in the thermal efficiency of the gas engine 1 becomes large relative to the variation in the temperature of the lubricating oil. That is, during 50% output or less, if the lubricating oil is excessively cooled by the engine cooling water, the thermal efficiency of the gas engine 1 is also excessively degraded. Accordingly, increasing the temperature of the lubricating oil by the oil cooler 11 can improve, rather than decreasing, the thermal efficiency of the gas engine 1 in the low to medium output area.

Thus, the temperature of the engine cooling water is set to be lower than the temperature of the lubricating oil in the oil pan 10a during 100% output and is set to be higher than the temperature of the lubricating oil in the oil pan 10a during 50% output so that the lubricating oil is cooled during 100% output and is heated during 50% output or less. Thereby it is possible to improve the thermal efficiency in the low to medium output area while minimizing the degradation of the thermal efficiency in the high output area.

Furthermore, when the above-described gas engine 1 is used as a drive source of an air conditioner, the period when it is driven at 50% or 30% output is significantly longer than the period when it is driven at 100% output. Therefore, using the gas engine 1 whose thermal efficiency is improved in the low to medium output area (50% output or less) results in improvement of the annual energy consumption efficiency of the gas engine 1.

Figure 4:
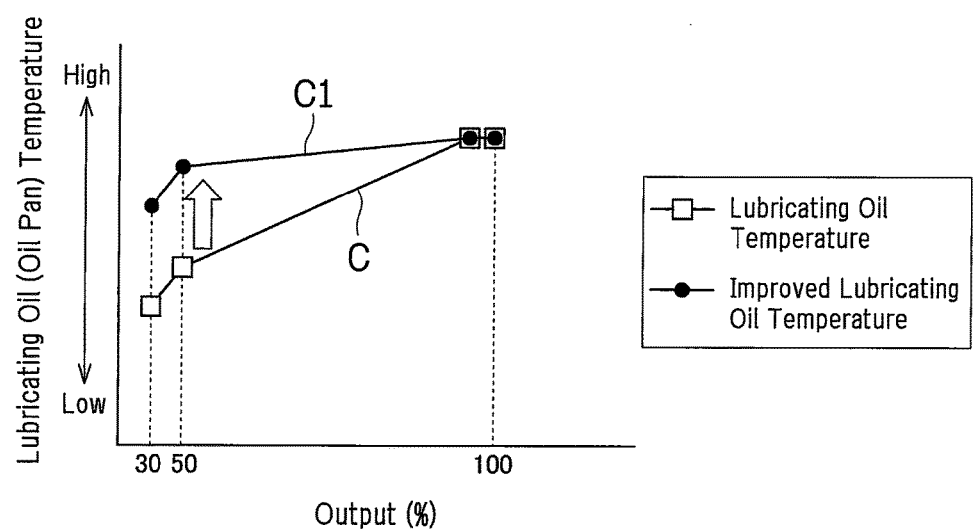
FIG. 4 is a graph showing a relationship between the output load and the temperature of the lubricating oil in the internal combustion engine according to another embodiment of the present invention.

In this embodiment, the temperature of the engine cooling water is fixed. However, with a configuration in which the engine cooling water is heated in the low to medium output area so as to have the high temperature as shown in FIG. 4, the temperature C of the lubricating oil in the oil pan 10a in the low to medium output area may be further increased to be the improved temperature C1 of the lubricating oil. In this case, in the low to medium output area of 30% output and 50% output, the temperature of the lubricating oil as well as the temperature of the engine cooling water are increased, which results in a stable combustion of the gas engine 1 and reduction of a mechanical loss. Thus, it is possible to further improve the thermal efficiency of the gas engine 1. It is possible to use heat generated in the gas engine main body 10 and the exhaust passage 4 as a heat source.

Also, in this embodiment, the lubricating oil accumulated in the oil pan 10a passes through the oil cooler 11. After that, the inside of the gas engine main body 10 is lubricated with the lubricating oil by the oil pump 18. As shown in FIG. 5, a nozzle-like oil jet 18a may be attached to the tip of the oil pump 18 so as to inject the lubricating oil into the rear surface of the piston 17 of the gas engine main body 10 using the oil jet 18a. The oil jet 18a is extended from the oil pump 18 so that the injection can reach the rear surface of the piston 17. In the piston 17, a cut-out 17a is provided in the vicinity of the oil jet 18a to prevent the oil jet 18a from being interfered with the piston 17.

Figure 6:
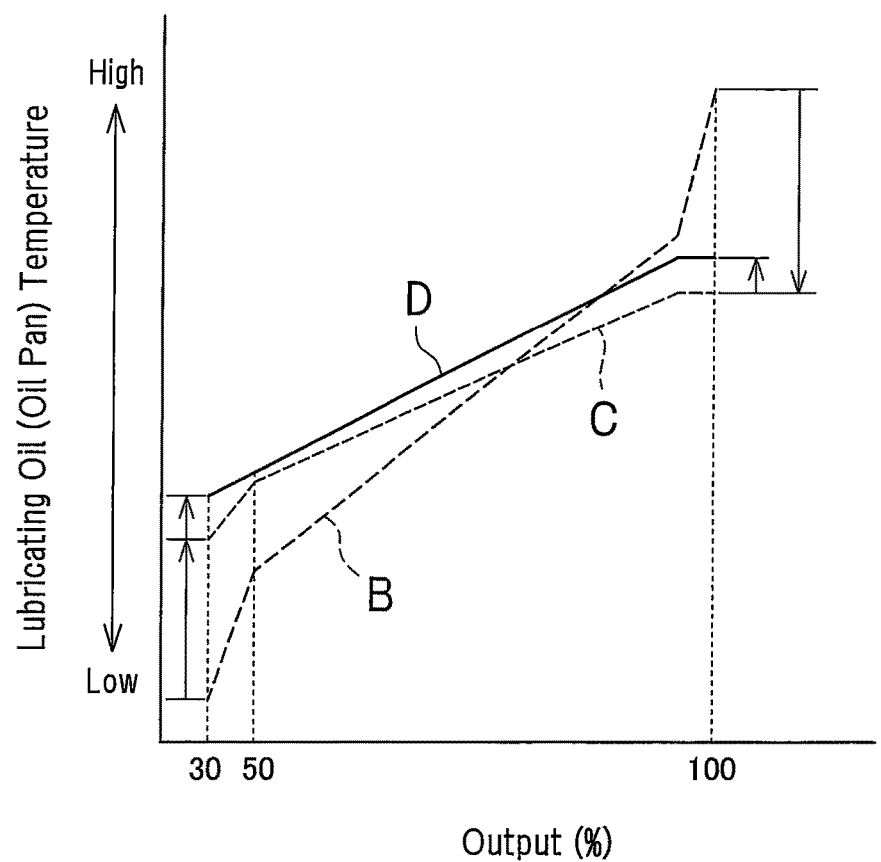
FIG. 6 is a graph showing a relationship between the output load and the temperature of the lubricating oil in the internal combustion engine shown in FIG. 5.

Since the oil jet 18a injects the lubricating oil into the rear surface of the piston 17 that is to have the highest temperature in the gas engine main body 10. Thus, the lubricating oil draws heat from the piston 17, and as shown in FIG. 6, the temperature C of the lubricating oil in the oil pan 10a is further increased so as to be another improved temperature D of the lubricating oil. Due to the oil jet 18a cooling the rear surface of the piston 17, the temperature of the lubricating oil is increased and the mechanical loss is reduced, while the temperature of a groove bottom of a top ring of the piston 17 is decreased and sticking of the top ring is prevented. Thus, the consumption of the lubricating oil is prevented from increasing. As a result, it is possible to further improve the thermal efficiency of the gas engine 1 while preventing the increase of the consumption of the lubricating oil.

The configuration of the oil jet 18a as shown in FIG. 5 may be combined with the configuration in which the engine cooling water is heated during the low to medium output as shown in FIG. 4.

Figure 7:
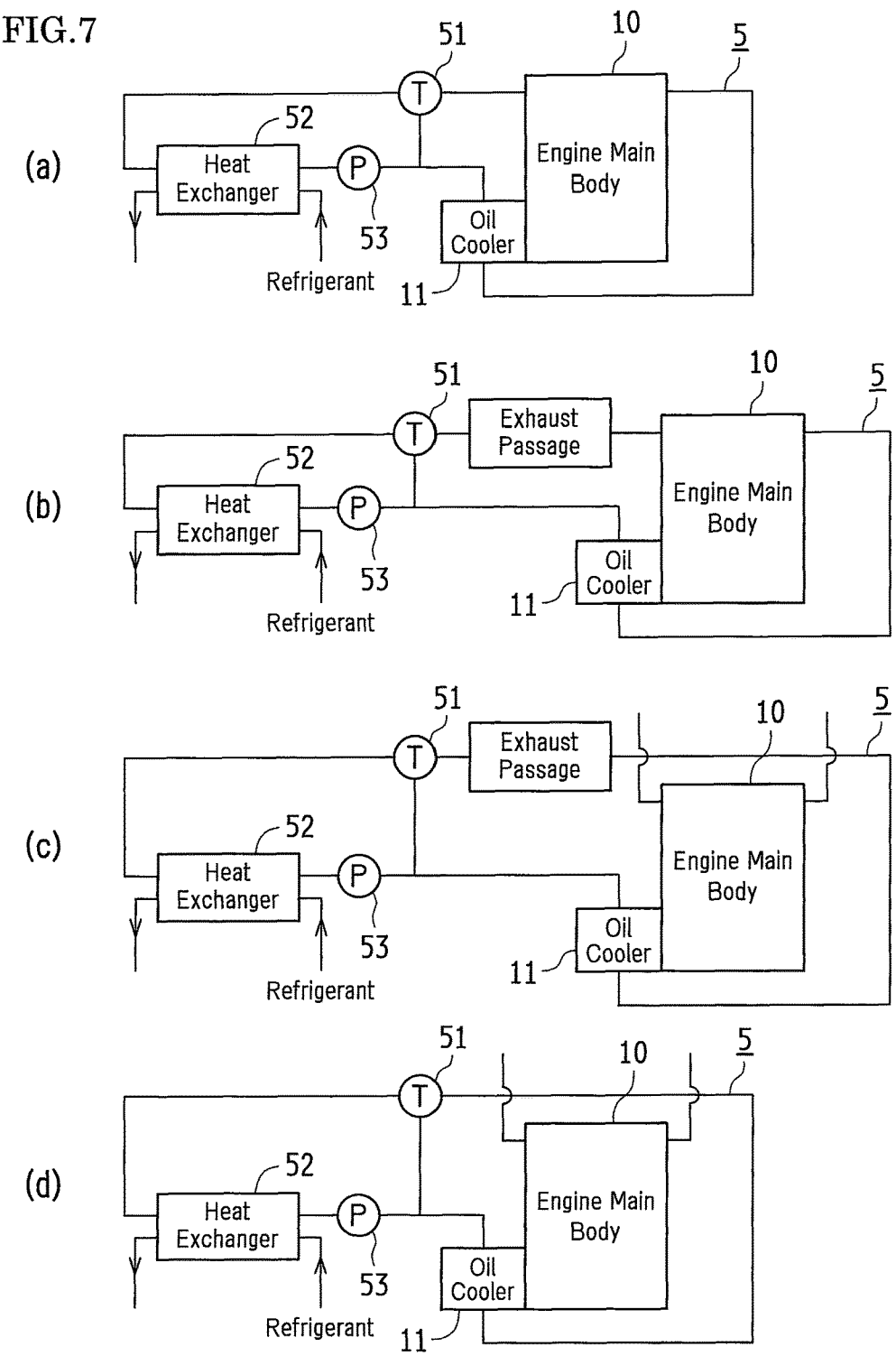
FIGS. 7(a) to 7(d) are schematic views respectively showing other aspects of a circulation passage of the internal combustion engine according to the present invention.

In this embodiment, as shown in FIG. 7(a), the circulation passage 5 is configured so that the engine cooling water, which cools or heats the lubricating oil by the oil cooler 11, is heated by the gas engine main body 10 and is cooled by the heat exchanger 52. However, as shown in FIG. 7(b), the circulation passage 5 may also be configured so that the engine cooling water is heated by the gas engine main body 10 and the exhaust passage 4 through which the exhaust gas having the high temperature passes, and is cooled by the heat exchanger 52. Also, as shown in FIG. 7(c), the circulation passage 5 may be configured so that the engine cooling water is heated by the exhaust passage 4 and is cooled by the heat exchanger 52. Also, as shown in FIG. 7(d), the circulation passage 5 may be configured so that the engine cooling water is cooled by the heat exchanger 52. In the configuration of the circulation passage 5 shown in FIGS. 7(c) and 7(d), the gas engine main body 10 may be cooled by another refrigerant.

According to the location or the environment where the gas engine 1 is used, the circulation passage 5 having the configuration most suitable for obtaining easily a predetermined temperature of the cooling water is selected out of the above-described configurations. In the present invention, the temperature of the cooling water is controlled to have a temperature within the range from 75 to 95° C., preferably from 80 to 90° C. in the output area of 30 to 100% output. Also, the temperature of the lubricating oil in the oil pan 10a cooled or heated by the above cooling water is controlled to have a temperature within the range from 73 to 93° C., preferably from 80 to 90° C. in the output area of 30 to 100% output.

Figure 8:
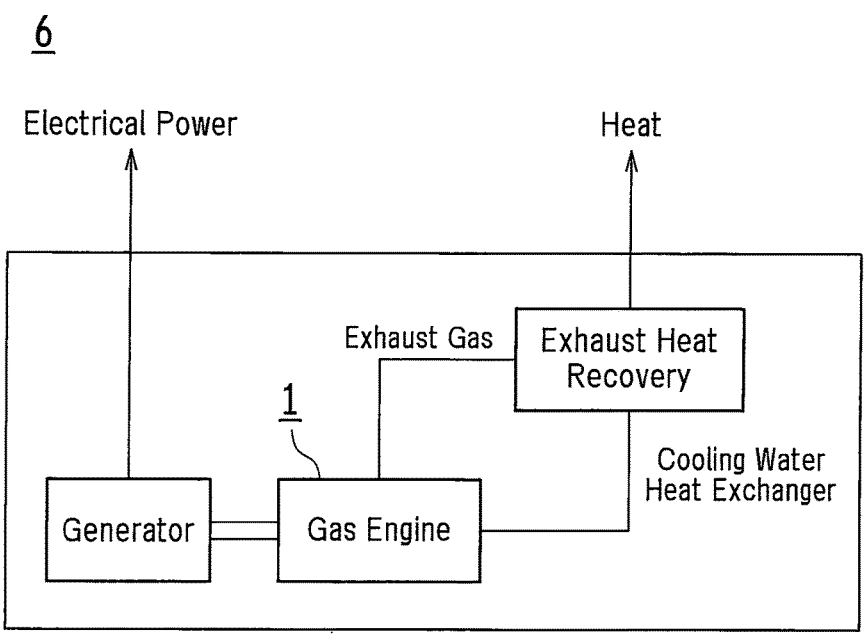
FIG. 8 is a schematic view showing a cogeneration system in which the internal combustion engine according to the present invention is used.

The gas engine 1 having the above-described configuration is applied to air conditioning. Especially, the gas engine 1 can be suitably used as a drive source of a cogeneration system 6, as shown in FIG. 8. That is, it is possible to save energy in the cogeneration system 6 by operating the cogeneration system 6 at low output during the normal operation and operating it at high output when it is switched to a heat main operation that requires a high load. Also, when exhaust heat is recovered by the cogeneration system 6, the gas engine 1 may be configured to recover the exhaust heat via a different passage from the circulation passage 5, or may be configured to recover the exhaust heat via the circulation passage 5 on the upstream side of the thermostat 51.

In this embodiment, the specific configuration of the gas engine 1 is not limited particularly to the configuration as shown in FIG. 1. It may also include, for example, a turbocharger, an intercooler and the like.

Also, in this embodiment, the gas engine 1 was described. However, the type of the internal combustion engine is not limited to the gas engine 1. It also may be, for example, a diesel engine, a gasoline engine, or other various types of engines.

The present invention may be embodied in other forms without departing from the gist or essential characteristics thereof. The foregoing embodiment is therefore to be considered in all respects as illustrative and not limiting. The scope of the present invention is indicated by the appended claims rather than by the foregoing description, and all modifications and changes that come within the meaning and range of equivalency of the claims are intended to be embraced therein.

DESCRIPTION OF REFERENCE NUMERALS

1 Gas engine
10 Gas engine main body
11 Oil cooler
12 Control unit
17 Piston
18a Oil jet

The invention claimed is:
1. An internal combustion engine comprising:
an oil cooler having a passage via which heat is exchanged between engine cooling water and lubricating oil; and
a control unit configured to:
control a temperature of the engine cooling water to a constant temperature; and
control the temperature of the engine cooling water to the constant temperature such that the temperature of the engine cooling water is lower than a temperature of the lubricating oil during high load operation and cools the lubricating oil in the oil cooler during the high load operation and is higher than the temperature of the lubricating oil during low to medium load operation and heats the lubricating oil in the oil cooler during the low to medium load operation.

2. The internal combustion engine according to claim 1 further comprising a circulation passage of the engine cooling water, the circulation passage comprising:
   a heat exchanger disposed along the passage via which the heat is exchanged between the engine cooling water and the lubricating oil, the heat exchanger being configured to cool the engine cooling water;
   a cooling water pump configured to allow the engine cooling water to pass through the heat exchanger; and
   a bypass passage configured to not pass through but skip and bypass the heat exchanger and the cooling water pump,
   wherein the control unit adjusts an operational force of the cooling water pump so as to control the temperature of the engine cooling water to the constant temperature by adjusting an amount of the engine cooling water passing through the heat exchanger and being cooled, and an amount of the engine cooling water passing through the bypass passage and not being cooled.

3. The internal combustion engine according to claim 2, wherein the circulation passage is configured so that the engine cooling water passes through an internal combustion engine main body and/or an exhaust passage.

4. The internal combustion engine according to claim 1, wherein the control unit controls the temperature of the engine cooling water to the constant temperature such that the control unit increases the temperature of the engine cooling water during the low to medium load operation compared with the temperature of the engine cooling water during the high load operation.

5. The internal combustion engine according to claim 2, wherein the control unit controls the temperature of the engine cooling water to the constant temperature such that the control unit increases the temperature of the engine cooling water during the low to medium load operation compared with the temperature of the engine cooling water during the high load operation.

6. The internal combustion engine according to claim 3, wherein the control unit controls the temperature of the engine cooling water to the constant temperature such that the control unit increases the temperature of the engine cooling water during the low to medium load operation compared with the temperature of the engine cooling water during the high load operation.

7. The internal combustion engine according to claim 1 further comprising an oil jet configured to inject the lubricating oil into a rear surface of a piston.

8. The internal combustion engine according to claim 1,
   wherein the internal combustion engine is a gas engine for a cogeneration system, and
   wherein the internal combustion engine operates at low to medium load during a normal operation, and operates at high load during a heat main operation.

9. The internal combustion engine according to claim 7,
   wherein the internal combustion engine is a gas engine for a cogeneration system, and
   wherein the internal combustion engine operates at low to medium load during a normal operation, and operates at high load during a heat main operation.

10. A cogeneration system using the internal combustion engine according to claim 7 as a drive source.

11. The internal combustion engine according to claim 2, wherein the heat exchanger is configured to cool the engine cooling water by a refrigerant.

12. The internal combustion engine according to claim 1 further comprising a circulation passage of the engine cooling water, the circulation passage comprising:
   a heat exchanger disposed along the passage via which the heat is exchanged between the engine cooling water and the lubricating oil, the heat exchanger being configured to cool the engine cooling water by a refrigerant; and
   a cooling water pump configured to circulate the engine cooling water in the circulation passage such that the engine cooling water passes through the heat exchanger and is cooled by the refrigerant.

* * * * *